US008508534B1

(12) United States Patent
George et al.

(10) Patent No.: US 8,508,534 B1
(45) Date of Patent: Aug. 13, 2013

(54) ANIMATING OBJECTS USING RELATIVE MOTION

(75) Inventors: Paul A. George, Hillsborough, CA (US); Robert S. Sargent, San Jose, CA (US); David C. Holloway, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1445 days.

(21) Appl. No.: 12/131,011

(22) Filed: May 30, 2008

(51) Int. Cl.
*G06T 13/00* (2011.01)

(52) U.S. Cl.
USPC .......................................... 345/473; 345/649

(58) Field of Classification Search
USPC ......................................... 345/473–475, 649
See application file for complete search history.

(56) References Cited

U.S. PATENT DOCUMENTS

| | | | | | |
|---|---|---|---|---|---|
| 5,150,312 | A | * | 9/1992 | Beitel et al. | 345/418 |
| 5,261,041 | A | * | 11/1993 | Susman | 345/473 |
| 5,276,785 | A | * | 1/1994 | Mackinlay et al. | 345/427 |
| 5,933,150 | A | * | 8/1999 | Ngo et al. | 345/473 |
| 6,040,841 | A | * | 3/2000 | Cohen et al. | 345/473 |
| 6,058,397 | A | * | 5/2000 | Barrus et al. | 1/1 |
| 6,128,631 | A | * | 10/2000 | Wallace et al. | 715/234 |
| 6,232,988 | B1 | * | 5/2001 | Barlow et al. | 345/473 |
| 6,256,048 | B1 | * | 7/2001 | Foster et al. | 345/474 |
| 6,414,685 | B1 | * | 7/2002 | Takakura et al. | 345/473 |
| 6,449,019 | B1 | * | 9/2002 | Fincher et al. | 348/578 |
| 6,956,576 | B1 | * | 10/2005 | Deering et al. | 345/475 |
| 2002/0021298 | A1 | * | 2/2002 | Fukuda | 345/427 |
| 2002/0024521 | A1 | * | 2/2002 | Goden | 345/474 |
| 2003/0043152 | A1 | * | 3/2003 | Raskar | 345/473 |
| 2006/0274070 | A1 | * | 12/2006 | Herman et al. | 345/474 |
| 2006/0284879 | A1 | * | 12/2006 | Nagata et al. | 345/582 |
| 2007/0188501 | A1 | * | 8/2007 | Yee et al. | 345/473 |

OTHER PUBLICATIONS

William Bares, Scott McDermott, Christina Boudreaux, and Somying Thainimit. 2000. Virtual 3D camera composition from frame constraints. In Proceedings of the eighth ACM international conference on Multimedia (MULTIMEDIA '00). ACM, New York, NY, USA, 177-186.*
Eric Allan Bier, 1987, "Skitters and jacks: interactive 3D positioning tools", Proceedings of the 1986 workshop on Interactive 3D graphics (I3D '86), Frank Crow and Stephen M. Pizer (Eds.), ACM, New York, NY, USA, pp. 183-196.*
Steven M. Drucker, Tinsley A. Galyean, and David Zeltzer, 1992, "CINEMA: a system for procedural camera movements", Proceedings of the 1992 symposium on Interactive 3D graphics (I3D '92), ACM, New York, NY, pp. 67-70.*

(Continued)

*Primary Examiner* — Maurice L McDowell, Jr.
(74) *Attorney, Agent, or Firm* — Schwegman, Lundberg & Woessner, P.A.

(57) ABSTRACT

Input is received that selects an animation aspect associated with an object within an animation. The animation involves the object and an original frame of reference through which the animation is displayed, and the selected animation aspect is one that changes over time with respect to the original frame of reference. The animation is displayed through a new frame of reference defined by holding the selected animation aspect constant over time. During the animation display through the new frame of reference, input is received that manipulates the object to create a new animation aspect associated with the object. The new animation aspect associated with the object is recorded in the animation.

33 Claims, 4 Drawing Sheets

(56) References Cited

OTHER PUBLICATIONS

Brian Hawkins, "Real-Time Cinematography for Games", 2005, Chapters 1-3, 7-8 and 12, Game Development Series, Charles River Media, Hingham, Massachusetts, 170 pages.*

Jock D. Mackinlay, Stuart K. Card, and George G. Robertson, "Rapid controlled movement through a virtual 3D workspace", SIGGRAPH Computer Graphics, vol. 24, Issue 4, Sep. 1990, pp. 171-176.*

Monaghan, J.M., & Clement, J., Dec. 2000, "Algorithms, visualisation, and mental models: High School students' interactions with a relative motion simulator", Journal of Science Education and Technology, vol. 9, Issue 4, pp. 311-325.*

Cary B. Phillips and Norman I. Badler, 1988, "JACK: a toolkit for manipulating articulated figures", Proceedings of the 1st annual ACM SIGGRAPH symposium on User Interface Software (UIST '88), ACM, New York, NY, USA, pp. 221-229.*

Keith Phillips and Wayne Piekarski, 2005, "Possession techniques for interaction in real-time strategy augmented reality games", Proceedings of the 2005 ACM SIGCHI International Conference on Advances in computer entertainment technology (ACE '05), ACM, New York, NY, Article 2, 10 pages.*

Plumlee, Matt D., and Ware, Colin, (2003), Integrating Multiple 3D Views through Frame-of-reference Interaction, Proceedings of the Coordinated and Multiple Views in Exploratory Visualization (CMV), London, London, UK, Jul. 15, 2003.*

Russell Turner, Francis Balaguer, Enrico Gobbetti, and Daniel Thalmann, 1991, "Physically-based interactive camera motion control using 3D input devices", Scientific visualization of physical phenomena, N. M. Patrikalakis (Ed.), Springer-Verlag New York, Inc., pp. 135-145.*

Ware, Colin, Plumlee, Matt D., Arsenault, Roland, Mayer, Larry A., Smith, Shep M., and House, Don H., (2001), "GeoZui3D: Data Fusion for Interpreting Oceanographic Data", IEEE Conference Proceeding Oceans, Honolulu, HI, USA, Nov. 5-Nov. 8, 2001.*

Fu-Kwun Hwang, "Relative Motion (frame of reference)", Java Animation and Screenshots from the NTNUJAVA Virtual Physics Laboratory, simple machine forum, dated Jan. 29, 2004, and retrieved on May 6, 2012 from: http://www.phy.ntnu.edu.tw/ntnujava/index.php?topic=140.0.*

\* cited by examiner

ANIMATING OBJECTS USING RELATIVE MOTION

BACKGROUND

The present disclosure relates generally to animating objects in a computing environment.

Computer animation allow users to create animated content for display on various platforms (e.g., web sites, mobile displays, etc.). Some systems allow users to build animations by recording motions of objects (e.g., graphical characters) for subsequent playback. For example, a user can click on an object displayed in a user interface and drag it around while the animation tool records the motion. This recorded motion can then be played back when the animation is run.

Animating an object can involve simply adding one type of movement to the object, such as rotation. But it can also involve adding a combination of movements (e.g., translation and rotation). Adding such combined motion to an object can be challenging, especially as the complexity of the object and the number of different desired movements increases.

SUMMARY

This specification describes technologies relating to animating objects in a computing environment using relative motion.

In general, in one aspect, a computer-implemented method is provided. The method includes receiving input that selects an animation aspect associated with an object within an animation, the animation involving the object and an original frame of reference through which the animation is displayed, and the selected animation aspect being one that changes over time with respect to the original frame of reference. The method includes displaying the animation through a new frame of reference defined by holding the selected animation aspect constant over time; during the animation display through the new frame of reference, receiving input that manipulates the object to create a new animation aspect associated with the object; and recording the new animation aspect associated with the object in the animation. Other embodiments can include corresponding systems, apparatus and computer program products.

Implementations can include one or more of the following features. For example, the method can include receiving input that generates the object in an animation environment, the animation environment defining a coordinate system. Receiving input that generates the object can include receiving input that defines a two-dimensional graphic in a two-dimensional animation environment. Displaying the animation through a new frame of reference can include accessing a data structure that maps the object and the coordinate system to a region on a user interface, and modifying the data structure to orient the new frame of reference to the selected animation aspect such that the selected animation aspect is held constant over time.

Receiving input that manipulates the object during the animation display can include receiving input that effects at least one of a rotation of the object, a translation of the object, and a scaling of the object.

Receiving input that selects an animation aspect can include receiving a selection of an animated aspect of the object. The animated aspect of the object can include at least one of an object size, an object orientation, and an object location. Displaying the animation through a new frame of reference can include displaying the animation through a new frame of reference defined by holding at least one of the object size, the object orientation, and the object location constant over time such that the selected animation aspect is displayed as a change to an animation environment over time through the new frame of reference. The change to the animation environment can include a change to at least one of a size, an orientation, and a location of at least one other object in the animation environment displayed over time through the new frame of reference.

Receiving input that selects an animation aspect can include receiving a selection of a region on the object. Receiving input that selects an animation aspect can include receiving the selection of the region on the object in combination with a selection of a reference point other than the selected region on the object.

Particular embodiments of the subject matter described in this specification can be implemented to realize one or more of the following and/or other advantages. For example, in some animations, previously recorded motion of an object can be played back while new motion is being added. Because the object is moving when the new motion is being added, it can be difficult to control the motion. Implementations consistent with this disclosure can allow users to more easily record successive motions to build up an animation.

Implementations consistent with this disclosure can provide advantages in situations in which users control complex movement of an object by acting directly on the object with a mouse or other similar input device. For example, a mouse can be used to control two-dimensional translation (grab object and move) or one-dimensional rotation through two-dimensional movement (grab object and use circular motion). However, it can be difficult to accurately and smoothly control both of these movements at the same time using a mouse. These movements can be controlled, for example, using specialized input devices with more degrees of motion (e.g. a mouse-like translation device with a rotating knob control on top) or using awkward keyboard input (e.g. for rotation) simultaneous with the mouse (e.g. for translation). Although encompassing arbitrary (and arbitrarily complex) input devices, implementations consistent with this disclosure can allow users to control complex movements with simple and familiar devices, such as a mouse already in the user's possession. Implementations consistent with this disclosure can allow a user to control any number of movement types by using successive recordings of simple motions. This can allow the user to build animations with familiar input devices (e.g., a mouse), rather than specialized input devices or awkward combinations of inputs. In addition, complex motions can be built up using simple gestures rather than requiring programming skills.

Additionally, implementations consistent with this disclosure can provide advantages in situations in which an animator wants one object to follow in relation to another object (a "peer" object) within a more complex scene. Consider, for example, a dog object chasing a cat object within a moving train object. Implementations consistent with this disclosure can allow a user to isolate to a frame of reference in which motion can be relative to other peers in the scene. For example, if the animator isolates to the motion within the train, the animator can record the cat running around and then record the dog chasing the cat within the relative context of the train's frame of reference.

The details of one or more embodiments of the subject matter described in this specification are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

In some implementations, an animation tool enables the creation and playback of animations. An animation can include an animation environment, one or more objects (e.g., a figure) that exhibit motion within the environment, and a view camera through which the animation is viewed. The camera can determine the projection of the animation onto a display device such as a computer monitor.

Objects can themselves be composed of sub-objects. For example a figure can be further refined to sub-objects that represent the head, torso, arms and legs. These can be further divided to the fingers, toes etc. These in turn can be further refined to the individual vertices (or other elements) describing the shapes.

Each object can have a location within the animation environment defined as a function of time. The location can include translational, rotational and scale components. An animation can be achieved by rendering through the camera the objects at their location according to successive time increments.

In some examples, a user or "animator" can construct an animation through one or more repetitions of the following four stages. At the first stage, the animator specifies a set of parameters that vary over time and that are to define the camera projection as the animation is played. The set of parameters can be any combination of (x, y) position, orientation angle, and scale factor. The projection is determined from these parameters by causing the (x, y) position to be projected to a fixed point, the angle to be projected to a constant angle and the scale factor to a constant length.

The animator can choose parameters that are derived from changing properties of objects in the animation. By so doing the animator can cause those properties (or derived properties) to remain fixed as the animation is played.

The position parameter can be specified by any of: (a) the position of a single object; (b) the position of a point relative to the bounding box of a single object; and (c) a weighted average of some combination of (a) and (b) for a subset of objects in the animation (for example, the mid-point between two objects). The orientation can be specified by any of: (a) the orientation of a single object; and (b) the orientation within the animation environment of a line connecting two points, those two points being specified by any of the same methods as may be used for position. The scale can be specified by any of: (a) the scale of a single object; and (b) the length within the animation environment of a line connecting two points, those two points being specified by any of the same methods as may be used for position.

At the second stage, the animation is displayed by the animation tool. The parameters specified in the first stage are used to determine the camera projection over time as the animation is displayed. At the third stage, as the animation is being displayed, the animator can modify parameters of one or more objects in the animation environment. For example, the animator might modify the position, rotation or color of one or more objects. At the fourth stage, the animation tool records the new object parameters as they are being manipulated by the animator. The example stages described above are not intended to be restrictive. Other stages and variations can therefore be used.

Figure 1:
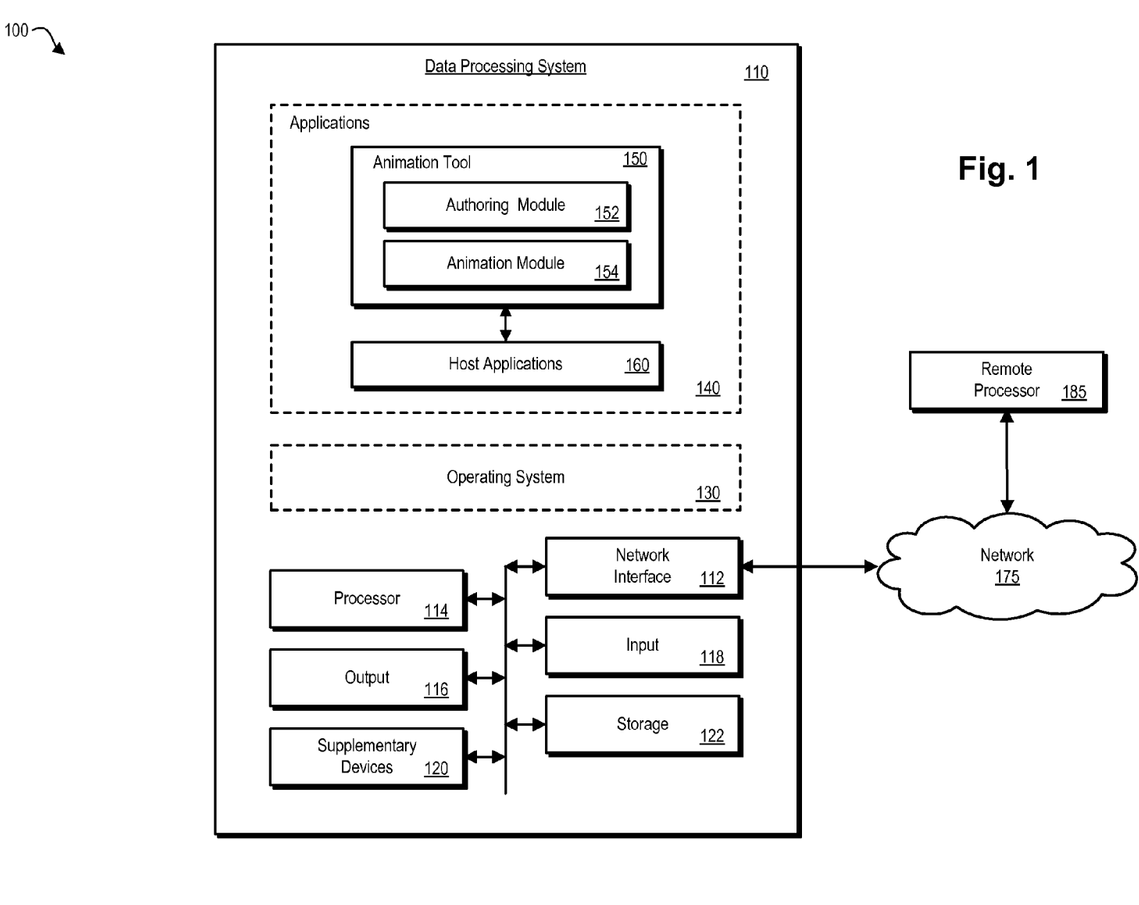
FIG. 1 is a block diagram depicting an example computing environment.

FIG. 1 shows an example computing environment 100 in which aspects of this disclosure can be implemented. The environment 100 includes an animation tool 150, which can be implemented in a data processing system 110. The animation tool 150 allows users or animators to create animations.

As noted above, an "animation" can involve an animation environment, one or more objects that exhibit motion within the animation environment, and a view camera through which the animation is viewed. As used herein, the term "object" refers to any type of presentation that can be visually or otherwise rendered to an observer. Examples include graphics (e.g., figures, shapes, text, illustrations, images, etc.) that can be displayed on an interactive medium, such as a user interface of a personal computer (e.g., a Web site) or mobile device, or other platform. Objects can be two-dimensional or three-dimensional, raster- or vector-based, and colored or monochromatic. Objects can be represented by data stored in various formats. In some examples, objects can be represented using various models, such as a wire frame model.

The "animation environment" or "stage" defines a space in which objects can be situated. The animation environment can define a world coordinate system (in which the origin and axes can be arbitrarily located). The positions of objects can be described with respect to these world coordinate axes. The animation environment can also include or define other coordinate systems. For example, each object involved in an animation can also have a local coordinate system (e.g., a set of axes that is defined relative to the object and moves with object as it animates), or objects can be collected into a group and the group assigned a coordinate system. A position given with respect to one coordinate system can be translated to a position with respect to another. In particular, objects can be described in terms of their position in world coordinates. The motion of an object can be described in terms of transformations over time of the object (or parts thereof) with respect to a coordinate system. Such transformations can include, but are not limited to, translations, rotations and scaling.

In some examples, animation environments can include graphical elements displayed on an interactive medium, such as a user interface of a personal computer (e.g., a Web site) or mobile device, or other platform. Animation environments can be two-dimensional or three-dimensional, raster- or vector-based, and colored or monochromatic. Thus, an animation environment can be another object in an animation. As an example, an object can include an automobile and the animation environment can include a graphical representation of a background setting (e.g., a road) in which the automobile moves. The animation environment can be stationary (or include stationary elements), and/or it can be moving (or include moving elements). In some examples, the animation environment can include a background of a website.

Animating an object can involve causing the object to exhibit some type of motion within the animation environment. As used herein, object "motion" or object "movement" refers to any perceivable change of an object with respect to an animation environment. Examples of object motion include translation (e.g., movement of an entire object or a rigid part of an object in a specified direction) and rotation (e.g., substantially circular or elliptical movement around a point or axis). In some examples, object motion can include various visual effects, such as morphing (e.g., transitioning one object to another object), fading, stretching, color changes, etc.

Animating can involve recording object motions that, when played back, generate an animation of the object. A user can manipulate an object through a user interface so that the object exhibits a certain motion, and the manipulation can be recorded for subsequent use in building an animation. For example, an animator can manipulate an object (e.g., a cloud) so that it moves from left to right across an animation environment (e.g., a sky) displayed on a computer. This manipulation can be recorded and then played back to create an animation. In some examples, the recorded manipulation can be mixed with other motion and effects (which can include other recorded user manipulations and/or other system-generated motions and effects) to generate an animation. Animators can build animations involving multiple objects by separately recording manipulations for each of the objects.

Animators can successively or iteratively add and record object manipulations to create compound motion. A "compound motion" refers to, for example, at least two motions of the same object that overlap in at least one point in time. Animations can be built on the compound motion of one or more objects. An example of a "compound motion" is an object (e.g., a cloud) rotating and simultaneously moving across (e.g., left to right) an animation environment (e.g., the sky). Another example is a human figure standing on a moving train while simultaneously trying to catch a ball. As a particular component (e.g., rotation of a cloud) of a compound object motion is being recorded, the animation tool 150 can play back previously recorded motions of that object (i.e., translation of the cloud) or other objects (e.g., birds) in the environment so that the animator can view the new motion being recorded in context.

The view camera defines how an animation is projected onto an intended display area, such as a display area (e.g., a display screen) of a computer, mobile device, handheld device or other platform. The view camera can define or be associated with a viewer's frame of reference. For example, it can be thought of as aligning with a viewer's eye or line of sight. The view camera itself can act as an object that moves in the animation environment. The view camera can be positioned at various points in the animation environment. In some examples, the view camera defines a coordinate system in which the origin is located at the camera viewing point. Thus, the viewer's eye point can be thought of as being at the origin of this coordinate system.

In some examples, the view camera can include or utilize a "view matrix," which maps the animation environment and objects in the environment to the intended display area. The view matrix can specify and control the manner in which objects and animation environments are displayed (e.g., the orientation and location of the objects on the screen). The view matrix can be composed of translation, scale and orientation. In some examples, the view matrix can map objects and the animation environment to the display area using one or more coordinate systems. For example, the view matrix can define objects and environments relative to a display using a coordinate system based on screen pixels. In some examples, the view matrix can map world coordinates of the animation environment to coordinates of the view camera.

The animation tool 150 facilitates animation of objects based on relativity. This can involve allowing the animator to specify a frame of reference through which an animation is displayed such that a selected aspect of the animation appears to be held fixed over time. The selected aspect of animation can include object position, object orientation and/or object scale. The animator can specify that at least one aspect should be fixed by selecting a frame of reference that locks or orients on that aspect while the animation plays and new motion is recorded relative to that frame of reference or any other frame of reference. Choosing a frame of reference can entail choosing an object and a particular subset of its motions (e.g., translation, rotation, etc.) that define the frame of reference such that the object will appear stationary within that frame of reference.

To select a frame of reference, the animator can specify that the view camera through which animation is viewed should track or follow an animated aspect of an object. In two-dimensional animations, for example, the view camera can have three parameters: (x, y) position, angular orientation, and scale (or zoom). The animator can specify that the camera should track one or more of these aspects. For example, the animator can choose to track the rotation of an object by selecting an object and indicating that its rotation should be tracked by the view camera. Because the camera tracks the animated aspect of the object, the animation tool 150 can cause that aspect to appear stationary when the animation is viewed.

The animator can choose to specify that the camera tracks any combination of position, orientation and scale, and the animation aspects being tracked need not be defined by the same object. In some examples, the animator can track just the position, the position and scale, position and rotation, rotation and scale, etc. Both position and rotation can be defined by a single object or position can come from one object and rotation from another.

In some examples, the animator can specify a frame of reference based on a group of objects (object peers). Consider, for example, a bag of marbles. The animator may wish to animate the individual marbles within the bag or animate the motion of the bag itself. To animate the individual marbles, for example, the animator can specify a frame of reference that allows the animator to individually manipulate each marble within the bag without having to deal with motion of the bag.

Fixing an aspect of animation during recording of a manipulation of an object can be especially useful in creating animations based on compound motion. Continuing with the train example noted above, the animator can specify that the camera should track the position of the figure on the train. The animator can then play the animation. When the animation is played back, the figure can appear stationary on the intended display area. During this play back, the animator can position the figure's hand and record its motion as it reaches to catch the ball. This can allow the animator to add the new motion without having to deal with other movement of the figure (i.e., the figure moving with the train).

In addition or as an alternative to selecting a frame of reference that keeps an animation aspect held constant (or fixed), the animation tool 150 can allow the animator to specify that at least one aspect of an object being animated should be disabled (stand still) while other motions in the animation environment remain active. The specified aspect includes an aspect (e.g., its position) that changes during animation of the object. The animator can choose, for example, to hold the object completely fixed (disable all object motion) or to hold some combination of its position, orientation and scale fixed.

In the example configuration shown in FIG. 1, the data processing system 110 can include various hardware and/or firmware components, such as a network interface 112, a processor 114, an output device 116, an input devices 118, supplementary devices 120, and a storage device 122. One or more system buses (not shown) can interconnect these components. The data processing system 110 can also include an operating system 130 (e.g., WINDOWS®, MAC®, UNIX®, LINUX®, and the like) and applications 140. The number, identity and arrangement of these elements are not limited to what is shown, and additional and/or different elements can be contained in or coupled to the elements shown. Further, the data processing system 110 can include fewer components than what is shown.

The network interface 112 may facilitate connectivity with a network, such as the network 175. Network interface 112 can be any appropriate wireline (e.g., IEEE 1394, USB, etc.) or wireless (e.g., IEEE 802.11™, BLUETOOTH®, IrDA®, etc.) mechanism for facilitating unidirectional or bidirectional transmission of data between the data processing system 110 and the network 175. The network interface 112 can include one or more network cards and/or data and communication ports.

The network 175 can include any element or system that facilitates communications among and between various network nodes. The network 175 can include one or more telecommunications networks, such as computer networks, telephone or other communications networks, the Internet, etc. The network 175 can include a shared, public, or private data network encompassing a wide area (e.g., WAN) or local area (e.g., LAN). In some implementations, the network 175 can facilitate data exchange by way of packet switching using the Internet Protocol (IP). The network 175 can facilitate wired and/or wireless connectivity and communication.

The processor 114 can execute instructions from storage (e.g., computer programs such as applications 140), route information among components of the data processing system 110, and/or perform various operations on data. Although FIG. 1 shows a single processor, the system 110 can include any number of general- and/or special-purpose processors, which can operate collaboratively or independently. In some examples, the processor 114 can include one or more application specific integrated circuits (ASICs) and/or various other circuitry. The processor 114 can include various logical elements and architectures (e.g., the von Neumann architecture, parallel architectures, etc.) and can perform various types of computational operations, such as sequential computation and parallel computation.

The output device 116 can present text, images, video, audio, or any other type of information. Examples of the output device 116 include, video display devices, audio display devices, printers, and the like. The output device 116 can display user interface information for various software applications running on the data processing system 110, as well as the operating system programs necessary to operate the system. The output 116 can present information by way of a cathode ray tube, liquid crystal, liquid crystal on silicon, light-emitting diode, gas plasma, laser, or other type of display mechanism. The output 116 can also be configured to receive, generate and/or present holographic or other visual representations. The output 116 can be configured to audibly present information, and it can include suitable components for receiving and presenting audio signals. Although FIG. 1 shows a single output 116, the system 110 can include any number of similar or different output devices.

The input device 118 can include components such as a keyboard, a mouse, a stylus, a pointing device, a joystick, and/or a touch screen. The input device 118 can also include audio- or video-capture devices (e.g., video cameras, microphones, etc.) and/or various sensors for capturing and processing emissions (e.g., thermal, motion, sound, etc.). It can also include one or more information reading devices (e.g., scanners, disk drives, etc.) and/or input ports. Although FIG. 1 depicts the input 118 as a single discrete element, the system 110 can include any number of similar or different input devices. For example, the system 110 can include a keyboard and a mouse as well as a video-capture device, a scanner and several disk drives.

Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

A user of the data processing system 110 can input commands to control and operate functionality of the system by way of the output device(s) 116 and the input device(s) 118. These commands can, for example, be input by way of user manipulation of physical controls, such as a keyboard or mouse. The user can input commands to select and manipulate objects presented on the output device 116.

The data processing system 110 can include various interfaces (not shown) for facilitating bidirectional or unidirectional communication between the system 110 and one or more of the input and output devices or other devices. The interfaces can include a combination of hardware, software and/or firmware components. The interfaces can include various connection ports, such as USB, RS-232, RS-485, Fibre Channel, Ethernet, IEEE 1394, RG-6, and/or TOSLINK®.

The supplementary devices 120 can be included in or attached to the data processing system 110. The supplementary device 120 can include, for example, various devices used for video and film editing. Examples include video controllers, video recorders, audio recording systems, backup power supplies, etc. Moreover, the supplementary devices 120 can include any digital print engine or marking engine, display monitor, or other raster output device capable of producing color or gray scale pixels on paper, film, display screen, or other output medium. Additionally, for displaying animations, a playback media player (e.g., the ADOBE® FLASH® Player software) incorporated in devices such as mobile phones, set-top boxes, handheld devices, or other display devices can be used.

The storage 122 can provide mass storage, working (e.g., cache) memory, and/or buffer space for the system 110. The storage 122 can be implemented using a variety of suitable memory elements. The memory elements can include, for example, solid state elements, optical elements, polymer elements, magnetic elements, and/or organic elements (e.g., crystals). The memory elements can be volatile or non-volatile and can be randomly or sequentially accessed. The storage 122 can include random access memory (RAM), flash RAM, read-only memory (ROM), erasable programmable read-only memory (EPROM), and electrically erasable programmable read-only memory (EEPROM). The storage 122 can include one or more fixed disk drives (e.g., a hard drive, RAID storage, etc.) and one or more removable disk drives (e.g., a CD-ROM drive, DVD drive, etc.). The storage 122 can also include one or more data repositories (e.g., relational, distributed and/or object-oriented databases), which can be local and/or remote to the data processing system 110. In some examples, the storage 122 can include one or more local and/or remote network-based storage architectures, such as a storage area network (SAN). Although a single storage element 122 is shown in FIG. 1, the data processing system 110 can include or interact with any number of individually configured storage elements 122.

The storage 122 can store program code for various applications, the operating system 130, an application-programming interface, application routines, middleware components, and/or other executable instructions. The storage 122 can include program code and information for communications (e.g., TCP/IP communications), middleware components, kernel and device drivers, invariant low-level systems code, data for basic input and output, and various configuration information.

In some implementations, the storage 122 includes at least one computer readable medium, which tangibly embodies one or more computer programs. The computer programs can contain instructions that, when executed by a processor, implement various methods (such as those described below) and/or systems. Computer readable medium refers generally to any type of computer program, apparatus and/or device (e.g., magnetic discs, optical disks, memory, Programmable Logic Devices (PLDs)) used to provide machine instructions and/or data to a processor. Computer readable media suitable for storing computer programs and data can include forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

The applications 140 refer to computer programs having some defined purpose appreciable by a user. The applications 140 can include various computer programs (also referred to as programs, software, software applications, software modules, or code), which contain instructions executable by the processor 114. In some examples, the applications 140 can be transferred to the storage device 122, e.g., by way of network transmissions (e.g., an Internet download) and/or removable disks (a CD-ROM or DVD). Computer programs consistent with this disclosure can be implemented in various programming languages, such as high- or mid-level procedural and object-oriented programming languages (e.g., C, C++, Java, JavaScript, PHP, Visual Basic, etc.), low-level assembly languages (Intel 80x86, ARM, etc.) and/or various other languages.

The animation tool 150 can be implemented as application software within the data processing system 110. A user of the data processing system 110 can interact with the animation tool 150 (e.g., through output and input devices 116 and 118) to perform various tasks, such as creating objects and object animations. The animation tool 150 can be built on an application support platform, which can include the operating system 130 and a runtime library that operates in conjunction with the operating system to provide support for applications on the data processing system 110.

In some examples, the animation tool 150 can be implemented as an independent, monolithic application that runs on the data processing system 110. Other implementations are also within the scope of this disclosure. For example, the animation tool 150 can be configured as an applet that runs in conjunction with a Web application. In some examples, the animation tool 150 can be implemented as a "plug-in" type component that provides various functionality to, and extends the feature set of, one or more host applications 160. The data processing system 110 can include various host applications (e.g., 160) that use such a plug-in component. The host applications 160 can provide services to the plug-in to allow the plug-in to interact with the host application. The host applications 160 (and/or the operating system 130) on the data processing system 110 can include APIs (application programming interfaces) (not shown) that allow plug-ins to be added and interact with the host applications 160. In some implementations, the animation tool 150 itself can include its own API, which can be used for accepting plug-ins. Non-limiting examples of APIs include the ADOBE® AFTER EFFECTS® API and the ADOBE® FLASH® Media Interactive Server Plug-in API, available from Adobe Systems Incorporated of San Jose, Calif.

The animation tool 150 can connect and provide services to one or more components, such as a remote processor 185 (which can include a Web server), over the network 175. For example, the animation tool 150 can run on the data processing system 110 and interact with Web servers and sites that display animations, such as Flash®-based web sites hosted by systems external to the data processing system 110.

The animation tool 150 is not limited to application-level software and, in some examples, can interact and/or be integrated into various system-level elements of the data processing system 110. For example, the animation tool 150 can include a system-level software component used by the operating system 130 to provide various user interface or other features.

Additionally, although depicted as software in FIG. 1, the animation tool 150 can include and/or be coupled to various hardware elements (within or external to the data processing system). In some examples, the animation tool 150 can include and/or use one or more embedded systems, such as microcontrollers, routers, etc.

In some examples, aspects of the animation tool 150 can include or be incorporated into animation software for creating multimedia content (e.g., ADOBE® FLASH® software, available from Adobe Systems Incorporated of San Jose, Calif.) and/or software for creating motion graphics and visual effects (e.g., ADOBE® AFTER EFFECTS® software, available from Adobe Systems Incorporated). Additionally or alternatively, aspects of the animation tool 150 can include or be incorporated into software for images and/or video (e.g., ADOBE® PHOTOSHOP® and ADOBE® PREMIERE® software, both available from Adobe Systems Incorporated). Other examples are also within the scope of this disclosure.

The animation tool 150 can include various functional modules, such as an authoring module 152 and an animation module 154. These discrete modules are used herein for purposes of explanation only, and various other arrangements are within the scope of this disclosure. For example, the authoring and animation modules 152 and 154 can be distributed across multiple data processing systems 110. Moreover, the various functionality of the modules 152 and 154 can be distributed or exist in more or less modules than what is shown in the figure. Additionally, the animation tool 150 can include more or less functionality than what is described in connection with modules 152 and 154. In some examples, the animation tool 150 can include components that reside in other applications and/or components. The particular configuration, arrangement and feature set of the animation tool 150 will be flexible and will depend on the particular operating environment.

The modules 152 and 154 can include and/or use one more data structures as well as one or more computational algorithms that can operate on various data. The modules 152 and 154 can include sets of instructions for performing various tasks, and the modules can output information for use by users or other systems. In some implementations, the modules can include one or more engines, which can output code that serves as input to other systems, engines or processes. The modules can include and/or use various hardware and firmware elements.

To facilitate user interaction, one or more of the modules 152 and 154 can generate and present various user interfaces. These interfaces can include any physical or virtual mechanisms by which a user can input information and/or by which a user can perceive information. In some examples, the modules 152 and 154 can generate visual interfaces, such as graphical user interfaces. Other types of interfaces can also be used. The interfaces can include one or more physical or virtual elements or widgets (e.g., buttons, sliders, windows, menus, lists, toolbars, navigation elements, etc.) that allow a user to view, navigate and/or input (e.g., select) information.

The authoring module 152 can include functionality for allowing users to create objects, animation environments and/or other content. The authoring module 152 can be used to create such content for various interface platforms, such as for web sites, mobile communication displays, handheld displays, set-top box displays, and other interactive media. The authoring module 152 can therefore include website authoring components.

In some examples, the authoring module 152 can allow users to design objects and animation environments through a user interface that provides access to various graphical design tools (which can be provided by the module 152 or some other module, application or system). In addition, or as an alternative, the authoring module 152 can allow user to select predefined objects or assemble objects from predefined object components. In some examples, the authoring module 152 can present a palette of predefined and pre-generated objects and components from which users can make selections. The authoring module 152 can also allow users to import objects from files accessible to the data processing system 110, and/or upload the object from a source accessible to the data processing system 110.

Objects and animation environments (which can be created by the authoring module 152) can be created and stored in various formats. The formats can employ various compression schemes (e.g., lossy and/or lossless compression) and various data structures (e.g., raster graphics and/or vector graphics). In some examples, objects can be represented as SWF (Shockwave Flash) data. Other example formats include SVG (Scalable Vector Graphics), X3D, VRML (Virtual Reality Modeling Language), XMT (extensible mpeg-4 textual format), HTML (HyperText Markup Language), FlashPix, APPLE QUICKTIME®, AVI (Audio Video Interleave), PICT, Animated GIF (Graphics Interchange Format), MICROSOFT ACTIVE MOVIE®, ADOBE PHOTOSHOP®, and ADOBE ILLUSTRATOR® and the like. Alternative formats include PDF (Portable Document Format), TIFF (Tagged Image File Format), JPEG (Joint Photographic Experts Group), GIF, ZIP, etc. The authoring module 152 can allow users to create and animate objects using the various formats, which can be selectable by users. In some examples, the animation tool 150 can include an API that accepts plug-ins for supporting one or more of the various formats.

The animation module 154 can include functionality used for animating objects created with the authoring module 152. The animation module 154 can receive and record object manipulations input from users. One or more data buffers or other temporary or permanent storage mechanisms of various capacity (e.g., 1 MB to 32 MB) can be used by (or included in) the animation module 154 for recording. The animation module 154 can allow users to successively input and record manipulations to create compound motion. The animation module 154 can present various user interface elements that allows a user to input manipulations and control the recording of manipulations.

In some examples, the animation module 154 can generate and present a "timeline" for use in animating objects. The timeline can divide time into segments or frames and graphically represent these segments. The animation module 154 can allow a user to store object manipulations at various points on the timeline in order to build an animation. The animation module 154 can allow a user to select points on the timeline to begin and end recording.

The animation module 154 can build or assemble animations based on the compound motion of one or more objects. For example, the animation module 154 can generate an animation involving multiple objects by assembling and running recorded manipulations for each of the objects involved in the animation. In some examples, the timeline can be used in building animations. In addition, the animation module 154 can employ various animation techniques, such as tweening, fading, etc. For example, with tweening, a user can insert motion at certain key frames in the timeline and the animation module 154 can interpolate and fill in the frames between those key frames with additional motion and/or visual effects to achieve smooth transitions.

In some implementations, the animation module 154 can infer object motion when building animations. For example, the objects themselves can include links with inverse kinematics used to infer additional motion from a user manipulation. As an example, a human figure can be represented as an object with several rigid members connected by joints. The animation module 154 can be configured to determine positions and angles of the jointed members associated with a specific pose of the human figure. When a user manipulates one of the rigid members (e.g., moves the figure's arm), the animation tool 150 can infer movements of other jointed members of the figure and animate those members to effect a certain pose or to ensure that the animation of the figure is consistent with the animation environment (e.g., the human figure's arm is positioned in proximity to a ball).

The animation module 154 can include or utilize a view camera to define how animations are projected onto an intended display area. The animation module 154 can include or utilize one or more data structures for mapping the animation environment and objects in the environment to an intended display area, such as a display area of the output device 116. These data structures can include a "view matrix" that specifies and controls the manner in which objects and animation environments are displayed (e.g., the orientation and location of the objects on the screen). The view matrix can be composed of translation, scale and rotation. These can be specified, in some example implementations, using matrices, vectors and affine transformations between vector spaces.

The view matrix can map objects and the animation environment to the display area using one or more coordinate systems. For example, as noted above, the view matrix can define objects and environments relative to a display using a coordinate system based on screen pixels. In some examples, the view matrix can include one or more transformation matrices for transforming object coordinates from one coordinate system (e.g., 3D world coordinates) to another (e.g., 2D screen coordinates).

The view matrix can contain various properties of objects and the animation environment, as well as associations between those properties and aspects of the intended display area. The view matrix can be implemented, for example, using various tables or other structures. In some implementations, the view matrix can include or utilize standard object modules. The view matrix can also be implemented in hardware.

The animation module 154 can render animations. This can involve assembling and presenting animations on a display, such as output device 116. The animation module 154 also provide services for rendering animations on one or more components over the network 175. For example, the animation module 154 can interact with Flash®-based web sites hosted by web servers remote to the system 110. The animation module 154 can also interact with various service providers, for example, to render animations on mobile devices.

The animation module 154 can provide functionality for creating animations based on relativity. As described above, this can involve allowing the animator to specify that certain motion should be relative to the object being animated during recording of a manipulation of the object. For example, that animator can specify that the view camera should track at least one aspect of an object being animated (e.g., its position). In addition, or as an alternative, the animator can specify that at least one aspect of an object being animated should stand still while the environment moves relative to that aspect. The animator can then add and record additional motion to the object while the at least one aspect is fixed. The recorded motions can build an animation of the object. The animation module 154 can present various user interface elements that allows user to utilize this functionality.

Figure 2:
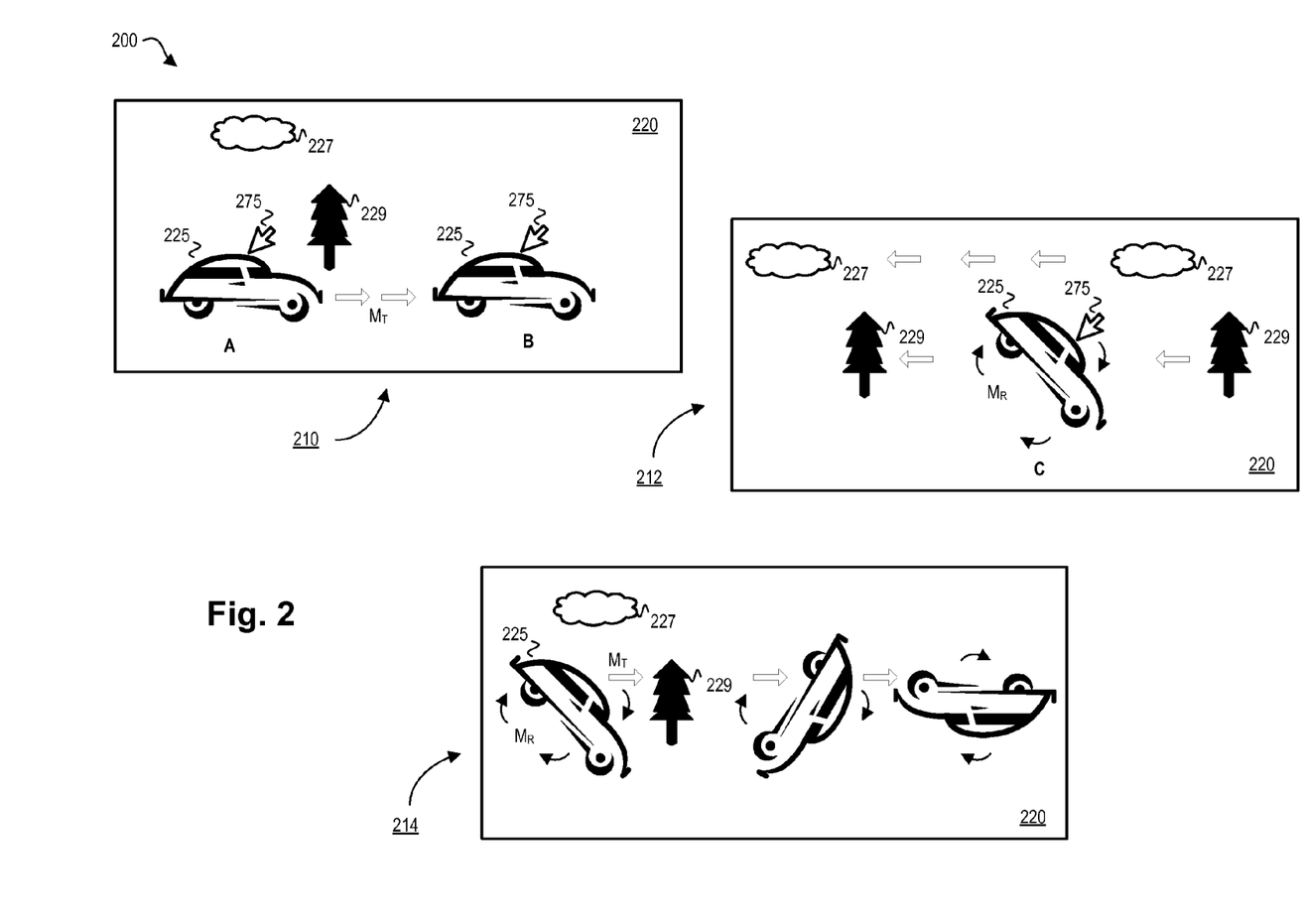
FIG. 2 is a block diagram depicting a conceptual overview of aspects of object animation.

FIG. 2 shows a conceptual overview 200 of animating based on relative motion. Referring to element 210, a user places one or more objects 225 in an animation environment 220, which can be presented to users in a graphical user interface displayed on an output device (e.g., output device 116). The animation environment 220 and object 225 can be created using the authoring module 152. The animation tool 150 can allow the user to create the object within the animation environment 220 or import it from some other design interface.

To animate the object 225, the animation tool 150 can allow the user to add motion to the object while the motion is recorded. Adding motion can involve, for example, translating the object and rotating the object. To add motion, the user can manipulate the object 225 using an input device. For example, a pointer or cursor 275 associated with a mouse or other input device 118 can be used to select and manipulate the object 225. In this example, the user selects object 225 using the cursor 275 and adds translational motion, $M_T$, to the object 225 by dragging it across the environment 220 from a position A to a different position B. The animation tool 150 records this manipulation as it occurs, for example, using the animation module 154.

The animation tool 150 allows the user to select an aspect of animation that will remain fixed during recording of additional object manipulations. Doing so can define a frame of reference that is tracked by the view camera thus causing the projection of that frame of reference to remain fixed in the display. A frame of reference can be defined by an origin point, an orientation angle and a scale factor. These parameters can be determined from a subset of the aspects of the animating objects specified by the animator. For example, the user can specify that the origin point be determined from the position of a selected object as that object translates in the animation environment during the animation.

Referring to element 212, the user can fix the positional aspect of the object animation by fixing the view camera so that it tracks the (x, y) position of the object 225 in the animation environment 220. Fixing the view camera to track position can cause the object 225 to appear stationary at an (x, y) position, C, in the animation environment 220. Because the camera tracks the object 225, the other objects (objects 227 and 229) in the animation environment 220 can appear to move against the motionless object 225.

The user can input the selection to fix an aspect of animation in various ways, and the selection can involve a single user action/selection or several actions/selections. In some examples, the user can fix an aspect of animation by simply selecting anywhere on the object 225 or by selecting a particular region or point on the object 225. In these scenarios, the animation module 154 can prompt the user to select the object 225 or a particular region on the object 225 in order to fix the object.

In some examples, the animation module 154 can present various menus and options, which can be hierarchically arranged, for fixing aspects of the object 225. For example, to select the entire object 225, the user can select a "Fix Object" option followed by an "Entire Object" sub-option. The user can then select from a menu of motions. For example, the user can select a "Position" option. The user can also select from a menu of previously recorded motions. For example, the user can select a "Last Recorded Motion" option to fix the horizontal position of the object 225.

In some examples, the animation module 154 can allow the user to fix an aspect of animation by selecting a region or point on the object in combination with a selection of some other reference point. This technique can be used, for example, to fix an aspect of animation (e.g., the position of the object) relative to some reference in the animation environment. For example, the user can select the object 225 and a point near or at object 229 to fix the position of the object 225 relative to the position of the selected point near or at object 229. As another example, consider a bicycle object moving across the stage, with the bicycle wheels rotating on the ground. The user can select an arbitrary point on one wheel and another arbitrary point on the other wheel and choose a frame of reference that keeps those two points stationary. Playing back the animation with this frame of reference can show a complex scene where the bicycle appears to buck around and the camera appears to zoom in and out.

In some examples, the user need not explicitly define a point fixed relative to some other object. Continuing with the train, dog, and cat example from above, two groups can be created in addition to these three individual objects. For example, a "world" group and a "train" group can be created. The train group can contain the train, the dog, and the cat, whereas the world group can contain the train group. The objects in the train group would move all together through the world or animation environment. As the train group moves, the train, the dog, and the cat would all be stationary with respect to one another. Additional dog and cat motion can then be added relative to the train group's position and not relative to the train itself.

In some examples, the tracking of the view camera can be defined by one or more reference points on one or more objects. As described above, in the 2D case, the view camera can have three parameters: (x, y) position, angular orientation, and scale (or zoom). In one example, the animator can specify that the camera should track an object by selecting an object to indicate that the (x, y) position of the camera should track the position of the object. If the (x, y) position is not well defined (e.g., the object is changing in shape), however, the user can choose to track a region of the object (e.g., center, top, left, etc.) or a specific point on the object (e.g., a vertex point of a vector object).

Position can be defined by an average of several points. For example, the animator can specify that the camera position should be fixed at the mid-point between two objects or the point equidistant from three other points. These new points can be used to define rotations or scales. With two pairs of balls being animated, for example, the rotation angle can be defined by the line connecting the mid-points of the pairs.

As another example, the animator can choose to track the rotation of an object. This can be accomplished by selecting an object and indicating that its rotation should be tracked by the view camera. The animator can also choose to track the rotation angle defined by multiple objects. For example, if the animation involved two rotating balls, a line between the center of the two balls will be at some angle with respect to the ground plane. The animator can specify that the view camera should track this rotation by selecting the two objects and indicating that the camera should track the angle between them.

An animator can also choose to track the scale of an object based on one or more reference points. If the object being animated is changing size, the animator can select the object and indicate that the camera should track its scale. For example, the scale of an object can be defined by the distance between two points. The user can track object scale by selecting these points.

The animation tool 150 can allow users to fix an animated aspect of particular object being animated with varying degrees of granularity, which can depend on the complexity and structure of the object being animated. For example, the animation tool 150 can allow the user to simply fix the position (or some other animated aspect) of the entire object 225. In addition, or as an alternative, the animation tool 150 can allow the user to fix the position (or some other animated aspect) of a component of the object 225 (e.g., the wheel). If the object were a character (e.g., a human figure) having various rigid members connected by joints, for example, the animation tool 150 can allow the user to fix the position of one or more of the rigid members while allowing other members of the character to move relative to the fixed aspect of the selected member.

In some examples, the animation tool 150 can fix an aspect of animation that involves multiple objects. For example, the user can choose to fix the position of a point that is half way between the object 225 and the object 229.

In some examples, the selected aspect of animation to be fixed can include a relationship between/among multiple objects (or object components/members). As an example, if two soccer ball objects were animated in an animation environment such they both simultaneously rotate around an axis while maintaining a constant distance from each other, the animation tool 150 can fix the positions of both of the soccer balls so that the rotation of the balls is displayed as rotation of the background environment rather than rotation of the balls. This can allow the user to add additional motion to the soccer balls, such as increasing and decreasing the distance between the balls in an oscillating manner. When the animation is eventually played back, the distance between the two soccer balls can vary as the balls rotate around each other.

To fix the selected aspect of the animation (e.g., the position of the object 225), the animation module 154 can access and modify the "view matrix" data structure that maps the objects (e.g., the object 225) and/or the animation environment 220 to the intended viewing space. For example, to hold the selected aspect fixed, the animation module 154 can modify a translation property in the view matrix by performing a transformation. As another example, to hold the selected aspect fixed, the animation module 154 can modify a scale property in the view matrix.

Once the user selects an aspect of animation to hold fixed, the user can record an new aspect of animation. The animation tool 150 can play back the previously recorded animation such that the selected aspect remains fixed and the animation environment (and other objects) move relative to the selected aspect. For example, in element 212, the translation of the object 225 is held fixed while other aspects of the animation environment (e.g., the objects 227 and 229) move relative to the object 225. During this playback, the user can add additional motion to the object 225 by further manipulating the object. For example, as shown, the user can add rotational motion, $M_R$, to the object 225. The animation tool 150 records this additional manipulation while playing back the other aspects of the animation relative to the object. Playing back the other aspects of animation while the new manipulation is being recorded allows the user to view the new motion in context.

In some implementations, the animation tool 150 can play back movement of the animation environment (and other objects) relative to the selected aspect in slow motion (or fast motion) or with other time-based effects. For example, the translation of the object 225 can be held fixed while other aspects of the animation environment (e.g., the objects 227 and 229) move relative to the object 225 in slow motion.

In some implementations, the animation tool 150 can play back movement by displaying visual cues (e.g., lines similar to graph paper or some other background element) in the animation environment. The visual cues can be displayed, for example, to display motion relative to an object in an animation environment that is monochromatic and lacking any other objects. The visual cues can be part of the authoring environment but need not be part of the produced animation itself.

As an example, consider an object recorded to move across the stage (the default frame of reference) with a blank/monochromatic background. Changing the frame of reference to the object and playing the animation would make it appear that nothing is changing over time, since the frame of reference can be defined by the object and no other objects/features are in motion relative to it. If the frame of reference were fixed to the object's translation but not to its rotation, the object can appear to rotate in place. If the frame of reference included all aspects of the object, then a time indicator can progress forward or some visual cue can be presented to show motion.

The animation tool 150 can then animate the object 225 by playing back or running the recorded manipulations without holding any aspect of the animation fixed. This is shown in element 214. As shown, the object 225 is animated with compound motion; that is, with both translational motion, $M_T$, and rotational motion, $M_R$.

To further illustrate aspects of animating based on relative motion, consider another example in which an inclined ramp object is placed on the animation environment (which is defined and fixed). A multi-colored beach ball object is placed at the top of the ramp. The animator then desires the beach ball to move down the ramp, and translation of the beach ball is recorded with it moving ("sliding") down the ramp (no rotation).

The animator then desires the beach ball to rotate as it moves down the ramp. To achieve this, the animator can choose to change the frame of reference from the animation environment to the beach ball so that the beach ball is the new frame of reference. Playing back the animation with the new frame of reference causes the beach ball to appear stationary and the ramp appears to slide upward against the beach ball, which is motionless within this (its own) frame of reference. During the play back, the animator records rotation of the beach ball as the ramp slides against it (e.g., by grabbing the edge of the beach ball and moving it in a circular motion). The animator can then change the frame of reference back to the stage. Playing back the animation now shows the beach ball rolling (both translating and rotating) down the ramp.

The animator then desires the beach ball to bounce as it rolls down the ramp. Once again, the animator can change the frame of reference from the stage to the beach ball. In this situation, the animator then temporarily disables the rotation motion of the beach ball. Playing back the animation with this aspect disabled shows the ramp sliding upward against the non-rotating beach ball. The animator then records the up and down bouncing motion. The animator can then re-enable the beach ball's rotation and change the frame of reference back to the stage. Playing back the animation now shows the beach ball rotating and bouncing down the stationary ramp.

The animator then desires for a bug to run along the top of the beach ball, as if it were on a treadmill. The animator can choose the frame of reference as the bouncing beach ball but can choose that rotation should not be included in the frame of reference. All motions are enabled but only some motions are fixed as part of the frame of reference. Playing back the animation now shows a rotating, non-translating beach ball with the ramp moving past it. The animator places a bug object on top of the beach ball and records the bug "running" on top of the beach ball using small translation movements forward and backward. The animator can then change the frame of reference back to the stage. Playing back the animation now shows the bug "running" on top of the ball is it rolls and bounces down the ramp.

For purposes of explanation only, certain aspects of this disclosure are described with reference to the discrete elements shown in FIGS. 1 and 2. However, the number, identity and arrangement of elements are not limited to what is shown. For example, the environment 100 can include any number of geographically-dispersed data processing systems 110, which can themselves be discrete, integrated modules or distributed systems.

Furthermore, additional and/or different elements not shown can be contained in or coupled to the elements shown in FIGS. 1 and 2, and/or certain elements shown can be absent. In some examples, the functions provided by the elements shown can be performed by less than the number of components shown or even by a single element. The elements shown can be implemented as individual processes that run on separate machines or a single process running on a single machine.

The data processing system 110 need not include all of the elements shown in FIGS. 1 and 2. Rather, in some implementations, the data processing system 110 can include only one or more processors for performing instructions and one or more memory devices for storing instructions and data. Moreover, the data processing system 110 can itself be embedded in another device or system, such as a mobile communications device (e.g., a mobile phone), a personal digital assistant (PDA), a mobile audio player, a Global Positioning System (GPS) receiver and the like.

Figure 3:
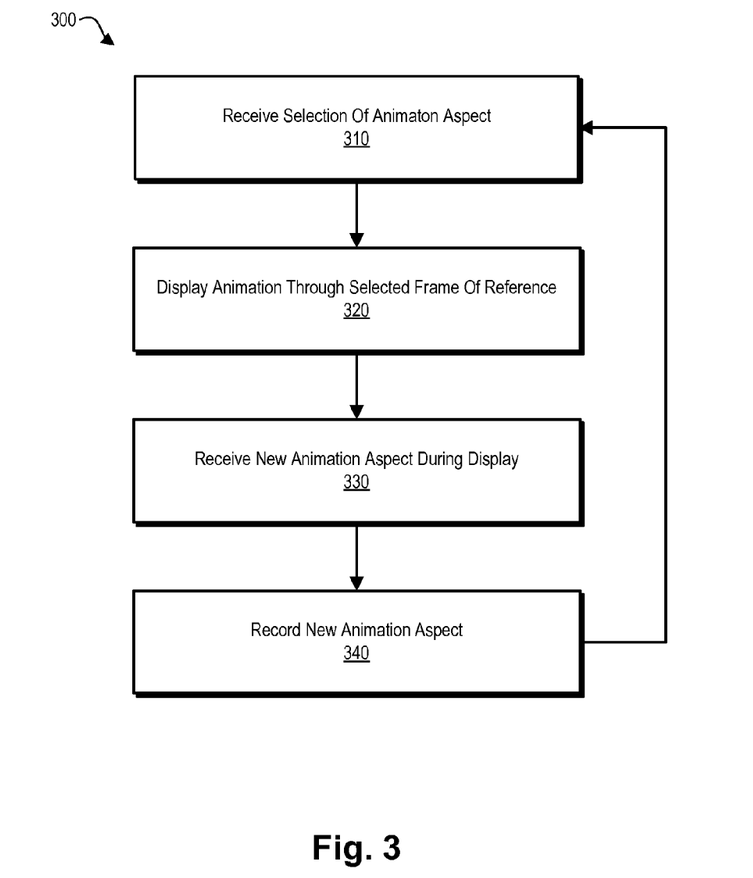
FIG. 3 is a flow diagram depicting an example animation process.

FIG. 3 is a flow diagram illustrating an example animation process 300. The process 300 can be performed by one or more elements in the data processing system 110. The process 300 can be performed by the processor 114 executing one or more instructions from the animation tool 150. The process 300 can involve, for example, receiving 310 a selection of an animation aspect associated with an object, displaying 320 the animation through a selected frame of reference, receiving 330, during the animation display, a new animation aspect associated with the object, and recording 340 the new animation aspect associated with the object.

The process 300 receives (310) a selection of an animation aspect associated with an object. An "animation aspect" can include any feature of the animation that is associated with the object, or any attribute of an object that changes when an animation of the object is displayed. Such changes can result from recorded user manipulations of the object or indirectly as a result of manipulation of some other element.

An animation can include the object, an animation environment and an original frame of reference. The original frame of reference can include the frame of reference associated with (e.g., fixed to) the animation environment. The original frame of reference can be a frame of reference through which all aspects of the animation are displayed from one vantage point. The original frame of reference can represent what is seen through the view camera (which can be aligned with a viewer's eye or line of sight) when the view camera is fixed or tracking the entire animation environment.

The "animation aspect" can include any attribute of the object that changes over time with respect to the original frame of reference when the object animation is displayed. For example, the animation aspect can include object position, object scale or object orientation with respect to the animation environment. Other attributes are also within the scope of this disclosure. In some examples, the "animation aspect" can include a relationship (e.g., a distance) between/among multiple objects (or object components). The animation aspect can be used to determine a view matrix or camera (discussed above), which maps the animation to an intended display area. In some examples, the selected "animation aspect" can include an aspect that was previously recorded.

Receiving a selection of an animation aspect associated with an object can include receiving a selection of a single animation aspect or receiving a selection of a combination of animation aspects. For example, object position can be selected or a combination of object position and object scale be selected.

Receiving a selection of an animation aspect associated with an object can include receiving a selection of an animated aspect of an object component or member. If the object includes various rigid members connected by joints, for example, the process 300 can receive a selection of one or more animated aspects (e.g., position, scale) of one or more of the rigid members.

Receiving (310) a selection of an animation aspect can include receiving input that selects an animation aspect. This can involve receiving from a user of the data processing system 110 one or more selections input by way of the input device 118. The selections can include selections of various elements presented in a user interface generated by the animation tool 150. Selecting an animated aspect can be accomplished by a single operation or by multiple operations by the user. In some examples, the user can select the animated aspect by simply selecting a region on the object, either alone or in combination with some other reference point. In some examples, the user can select the animation aspect by navigating through and selecting various menu options. A combination of these techniques and other techniques can also be used to select an animation aspect.

The process 300 displays (320) the animation through a selected frame of reference, which can include a frame of reference different from the original frame of reference associated with the animation environment. Displaying the animation can involve playing back previously recorded object manipulations. The selected frame of reference can be defined based on the selected animation aspect, e.g., by holding the selected animation aspect constant over time. The selected frame of reference can be one that follows the selected animation aspect. Displaying the animation through the selected frame of reference can cause the selected animation aspect (e.g., its (x, y) position) to appear to remain constant over time while the rest of the environment outside of the selected frame of reference moves relative to that selected aspect.

The displaying (320) can involve holding the selected aspect fixed by adjusting the view matrix or view camera so that it tracks the selected aspect. By tracking the selected aspect, that aspect can appear to be remain stationary relative to the animation environment. For example, if the camera tracks (x, y) position of the object, then the (x, y) position can appear stationary. The selected aspect of animation (e.g., the object position) can be displayed in the selected frame of reference as changes to other elements in the animation environment (e.g., changes to the positions of other objects).

If the selected aspect is object position, for example, the object can appear to stand still at a fixed position in the animation environment while everything else in the environment (e.g., other objects) moves relative to the object. If the selected aspect includes an aspect of an object component, the selected component of the object can be held fixed while other components of the object move relative to the fixed animated aspect of the selected object component.

The process 300 can fix the selected aspect by modifying one or more data structures that associate the selected aspect with a viewing space. For example, the process 300 can fix the selected aspect by modifying a data structure maintained by the animation module 154 such that the coordinates (e.g., pixel coordinates) of the object are held fixed.

In some implementations, the displaying (320) can involve disabling the selected animation aspect and enabling other aspects. That is, the animation can be displayed such that the selected aspect of the object is fixed while other elements in the environment are allowed to move. This can be optional.

At stage 330, the process 300 receives, during the animation display, a new animation aspect associated with the object. In some examples, the "new" animation aspect can include an aspect of the object other than the aspect selected at stage 310. For example, the selected aspect can be object scale, whereas the new animation aspect can include translation of the object. Receiving (330) a new animated aspect can involve receiving user input that manipulates the object. For example, the process 300 can receive an input that rotates the object around a point or axis. Such input can be received from a user by way of the input device 118.

At stage 340, the process 300 records the new animation aspect associated with the object. The recording of the new animation aspect associated with the object can occur simultaneously with the receiving of the new animation aspect. That is, as the user inputs a manipulation, the process 300 can record the manipulation. Recording the new animation aspect can involve storing the recorded information, for example, in the storage 122 for subsequent retrieval.

As shown in FIG. 3, the process 300 can be an iterative process to allow user to add compound motion to objects. For example, after the new animation aspect is recorded (340), the process 300 can receive (310) a selection of another animation aspect. At this iteration, the selected animation aspect can be the aspect that was recorded at stage 340 during the previous iteration of the process. The process 300 can continually receive selections of animation aspects and record new aspects for a number of iterations sufficient to build the desired animated. That is, a user can build a desired animation by successively recording manipulations, selecting aspects to hold fixed, and recording new manipulations. This can allow users add compound motion to objects, which can be used to build animations.

In some examples, the process 300 can be used to add motion to and animate multiple objects. For example, receiving (310) a selection of an animation aspect can involve receiving animated aspects of more than one object in an animation environment and/or receiving a selection of a relationship (e.g., a distance) between/among multiple objects. The process can display (320) the animation through a selected frame of reference so that the selected aspect appears fixed by defining the frame of reference based on the multiple objects (or their relationship). The process 300 can then receive and record new animation aspects (330, 340).

Continuing with the soccer ball example from above, the process 300 can fix the positions of the two soccer ball objects in the animation environment so that the two balls remain fixed relative to the animation environment and/or relative to each other. For example, the animation tool 150 can fix the positions of both of the soccer balls relative to each other so rotation of the balls around an axis is displayed as rotation of the background environment rather than rotation of the balls. The process 300 can also fix, for example, the position of an insect object sitting on one of the soccer balls. The process 300 can then receive a new manipulation by receiving motion to the insect object that causes it to jump back and forth between the two soccer balls. When the animation is eventually played back, the two soccer balls can be rotating and translating with the insect jumping back and forth between the two balls.

Figure 4:
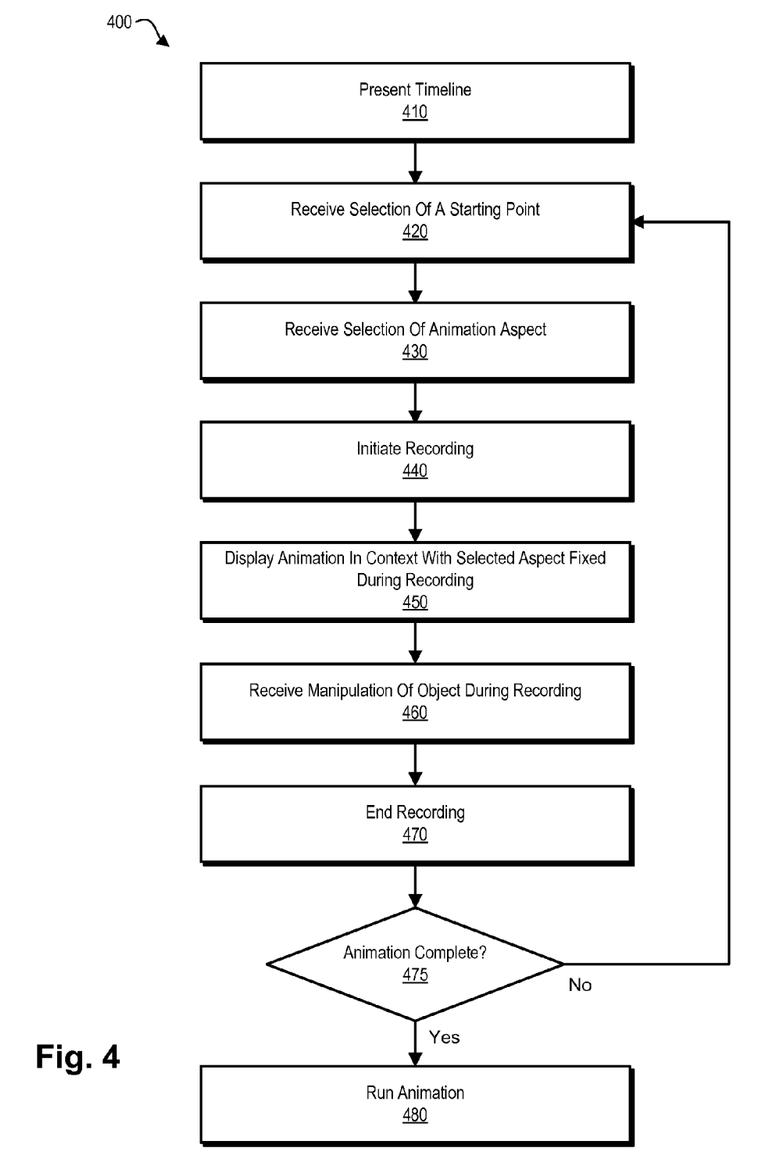
FIG. 4 is a flow diagram depicting another example animation process.

Turning now to FIG. 4, a flow diagram depicting another animation process 400 will be discussed. The process 400 can be performed by one or more elements in the data processing system 110. The process 400 can be performed by the processor 114 executing one or more instructions from the animation tool 150.

The process 400 can involve presenting (410) a timeline. This can involve dividing time into various segments and graphically displaying these increments. For example, the process 400 can present a graphical user interface element that displays a time scale and various markings that break the time into segments. In some examples, the timeline can represent the duration of an animation. As an example, the animation of an object can last two minutes, and the timeline can divide this duration into various increments, such as one-second increments.

In some examples, the timeline can correspond to frames that can be played back in sequence. Each frame can represent a visual picture or effect (e.g., position) of an object. When the frames of the timeline are played back in sequence, the object can appear to be animated. Some implementations can include key frames, which can be used by the process 400 for tweening and/or other animation techniques.

The process 400 can receive (420) a selection of a starting point. This can involve receiving a user selection of point or frame on the graphical timeline. For example, the user can select a starting point that is 15 seconds into the animation. In some examples, the user can input a selection by clicking or otherwise selecting one or more points on a graphical timeline.

The process 400 can receive (430) a selection of an animation aspect associated with an object. This stage of the process 400 can be similar to stage 310 of process 300. The process 400 can receive, for example, a user selection of object position or a combination of object position and rotation.

The process 400 can then initiate recording (440). This can involve initiating the recording of new motion for the object, such a rotational motion. The process can initiate recording in response to a user selection, such as a selection of the object itself, a selection of a particular key, and/or a selection of a particular user interface element (e.g., a record button).

During the recording, the process 400 can display an animation of the object in context with the selected aspect held fixed (450). Displaying the animation of the object in context can include displaying recorded events for other objects so that the new motion being recorded can be seen in context. Displaying the animation with the selected aspect held fixed can involve displaying the animation through a selected frame of reference, as discussed above. The frame of reference can follow the selected animation aspect so that the selected animation aspect appears to remain constant over time while the rest of the environment outside of the selected frame of reference moves relative to that selected aspect. In some examples, movement of the environment relative to the selected aspect can be displayed in slow motion or fast motion.

During the recording, the process 400 can receive (460) a manipulation of the object. This can involve, for example, a user clicking or otherwise selecting on the object and moving the object around the animation environment. In some examples, the process 400 can allow the user to manipulate the object in response to some user input (e.g., holding down a particular key, selecting an interface option, etc.). The received manipulation can include, for example, object rotation and/or translation within the animation environment. The user can input the object manipulation by way of the input device 118.

The process 400 can then stop the recording (470). In some examples, the process 400 can stop the recording in response to a user command, such as a selection of a particular key and/or a selection of a particular user interface element (e.g., a stop button). In addition, or as an alternative, the process 400 can automatically stop recording after a certain amount of time, which can correspond to a recording buffer capacity. In some examples, the process 400 can stop the recording in response to the user releasing control of or de-selecting the object being manipulated (e.g., the user stops dragging the object around the animation environment or releases some key or mouse button).

The process 400 can then decide (475) whether the animation is complete. This can involve determining whether there are any additional manipulations to be recorded by the user, for example, by presenting various prompts to the user or evaluating various user selections. In some examples, the decision 475 can be made based on a user selection that indicates the animation is complete, such as a user selection of an interface element (e.g., an "animation done" button).

If the animation is not complete, the process 400 can receive a selection of another recording starting point (420) and a selection of another animated aspect (430). The process 400 can then proceed through the various other stages 440-470. The process 400 can continue for a number of iterations sufficient to build the desired animation.

When the animation is complete, the process 400 can run the animation (480). Running the animation (480) can involve playing back frames of the timeline in sequence, as well as performing various tweening, interpolation and other animation techniques. With tweening, for example, the user can insert motion at certain key frames in the timeline (during previous stages of the process), and the process 400 can interpolate and fill in the frames between those key frames with additional motion when the animation is run (at stage 480). In some examples, running the animation can involve inferring motion of objects based on inverse kinematics (discussed above).

Running the animation (480) can involve playing back recorded manipulations without any aspect of animation being held fixed. In some examples, this stage (480) can involve assembling various manipulations to build an animation based on compound motion. Continuing with the soccer ball example from above, running the animation (480) can involve assembling and playing back an animation in which two soccer balls are independently rotating and translating in an animation environment while an insect jumps back and forth between the two moving balls.

The sequences of events shown in FIGS. 3 and 4 are examples and not intended to be limiting. Other processes can therefore be used and, even with the processes 300 and 400 depicted in FIGS. 3 and 4, events can be re-ordered, added and/or removed. Furthermore, the elements of the processes can overlap and/or can exist in fewer stages than the number shown in the figures. In some examples, processes can be re-arranged and configured to accommodate and/or exploit multitasking and parallel processing techniques and/or other aspects of various system architectures.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. In addition, embodiments within the scope of this disclosure can encompass various contexts. As an example, embodiments within the scope of this disclosure can include a machine vision system that interprets real-world actions (e.g., real paper puppets) and translates what it sees (e.g., via a live video stream) into computer-world virtual manipulations. Other contexts are also possible.

The invention claimed is:

1. A computer-implemented method, comprising:
    receiving input that selects an animation aspect associated with an object within an animation, the animation involving the object and an original frame of reference through which the animation is displayed, and the selected animation aspect being one that changes over time with respect to the original frame of reference;
    displaying the animation through a new frame of reference defined by holding the selected animation aspect constant over time;
    during the animation display through the new frame of reference, receiving input that manipulates the object relative to the new frame of reference to create a new animation aspect associated with the object creating a compound animation of the object in the original frame of reference; and
    recording the new animation aspect associated with the object in the animation.

2. The method of claim 1, further comprising:
    receiving input that generates the object in an animation environment, the animation environment defining a coordinate system.

3. The method of claim 2, wherein receiving input that generates the object comprises receiving input that defines a two-dimensional graphic in a two-dimensional animation environment.

4. The method of claim 2, wherein displaying the animation through a new frame of reference comprises:
    accessing a data structure that maps the object and the coordinate system to a region on a user interface; and
    modifying the data structure to orient the new frame of reference to the selected animation aspect such that the selected animation aspect is held constant over time.

5. The method of claim 1, wherein receiving input that manipulates the object comprises receiving input that effects at least one of a rotation of the object, a translation of the object, and a scaling of the object.

6. The method of claim 1, wherein receiving input that selects an animation aspect comprises receiving a selection of an animated aspect of the object.

7. The method of claim 6, wherein the animated aspect of the object includes at least one of an object size, an object orientation, and an object location.

8. The method of claim 7, wherein displaying the animation through a new frame of reference comprises:
displaying the animation through a new frame of reference defined by holding at least one of the object size, the object orientation, and the object location constant over time such that the selected animation aspect is displayed as a change to an animation environment over time through the new frame of reference.

9. The method of claim 8, wherein the change to the animation environment includes a change to at least one of a size, an orientation, and a location of at least one other object in the animation environment displayed over time through the new frame of reference.

10. The method of claim 1, wherein receiving input that selects an animation aspect comprises receiving a selection of a region on the object.

11. The method of claim 10, wherein receiving input that selects an animation aspect comprises receiving the selection of the region on the object in combination with a selection of a reference point other than the selected region on the object.

12. A computer animation system, comprising:
a processor; and
a computer readable medium coupled with the processor, the computer readable medium including instructions operable to cause the processor to perform operations comprising:
receiving input that selects an animation aspect associated with an object within an animation, the animation involving the object and an original frame of reference through which the animation is displayed, and the selected animation aspect being one that changes over time with respect to the original frame of reference;
displaying the animation through a new frame of reference defined by holding the selected animation aspect constant over time;
during the animation display through the new frame of reference, receiving input that manipulates the object relative to the new frame of reference to create a new animation aspect associated with the object creating a compound animation of the object in the original frame of reference; and
recording the new animation aspect associated with the object in the animation.

13. The system of claim 12, wherein the operations further comprise:
receiving input that generates the object in an animation environment, the animation environment defining a coordinate system.

14. The system of claim 13, wherein receiving input that generates the object comprises receiving input that defines a two-dimensional graphic in a two-dimensional animation environment.

15. The system of claim 13, wherein the instructions that cause the processor to display the animation through a new frame of reference comprise instructions that cause the processor to perform operations comprising:
accessing a data structure that maps the object and the coordinate system to a region on a user interface; and
modifying the data structure to orient the new frame of reference to the selected animation aspect such that the selected animation aspect is held constant over time.

16. The system of claim 12, wherein the instructions that cause the processor to receive input that manipulates the object comprise instructions that cause the processor to receive input that effects at least one of a rotation of the object, a translation of the object, and a scaling of the object.

17. The system of claim 12, wherein the instructions that cause the processor to receive input that selects an animation aspect comprise instructions that cause the processor to receive a selection of an animated aspect of the object.

18. The system of claim 17, wherein the animated aspect of the object includes at least one of an object size, an object orientation, and an object location.

19. The system of claim 18, wherein the instructions that cause the processor to display the animation through a new frame of reference comprise:
instructions that cause the processor to display the animation through a new frame of reference defined by holding at least one of the object size, the object orientation, and the object location fixed over time such that the selected animation aspect is displayed as a change to an animation environment over time through the new frame of reference.

20. The system of claim 19, wherein the change to the animation environment includes a change to at least one of a size, an orientation, and a location of at least one other object in the animation environment displayed over time through the new frame of reference.

21. The system of claim 12, wherein the instructions that cause the processor to receive input that selects an animation aspect comprise instructions that cause the processor to receive a selection of a region on the object.

22. The system of claim 21, wherein the instructions that cause the processor to receive input that selects an animation aspect comprise the instructions that cause the processor to receive the selection of the region on the object in combination with a selection of a reference point other than the selected region on the object.

23. A computer program product, encoded on a non-transitory computer-readable medium, operable to cause data processing apparatus to perform operations comprising:
receiving input that selects an animation aspect associated with an object within an animation, the animation involving the object and an original frame of reference through which the animation is displayed, and the selected animation aspect being one that changes over time with respect to the original frame of reference;
displaying the animation through a new frame of reference defined by holding the selected animation aspect constant over time;
during the animation display through the new frame of reference, receiving input that manipulates the object relative to the new frame of reference to create a new animation aspect associated with the object creating a compound animation of the object in the original frame of reference; and
recording the new animation aspect associated with the object in the animation.

24. The computer program product of claim 23, further comprising:
receiving input that generates the object in an animation environment, the animation environment defining a coordinate system.

25. The computer program product of claim 24, wherein receiving input that generates the object comprises receiving input that defines a two-dimensional graphic in a two-dimensional animation environment.

26. The computer program product of claim 24, wherein displaying the animation through a new frame of reference comprises:
  accessing a data structure that maps the object and the coordinate system to a region on a user interface; and
  modifying the data structure to orient the new frame of reference to the selected animation aspect such that the selected animation aspect is held constant over time.

27. The computer program product of claim 23, wherein receiving input that manipulates the object comprises receiving input that effects at least one of a rotation of the object, a translation of the object, and a scaling of the object.

28. The computer program product of claim 23, wherein receiving input that selects an animation aspect comprises receiving a selection of an animated aspect of the object.

29. The computer program product of claim 28, wherein the animated aspect of the object includes at least one of an object size, an object orientation, and an object location.

30. The computer program product of claim 29, wherein displaying the animation through a new frame of reference comprises:
  displaying the animation through a new frame of reference defined by holding at least one of the object size, the object orientation, and the object location fixed over time such that the selected animation aspect is displayed as a change to an animation environment over time through the new frame of reference.

31. The computer program product of claim 30, wherein the change to the animation environment includes a change to at least one of a size, an orientation, and a location of at least one other object in the animation environment displayed over time through the new frame of reference.

32. The computer program product of claim 23, wherein receiving input that selects an animation aspect comprises receiving a selection of a region on the object.

33. The computer program product of claim 32, wherein receiving input that selects an animation aspect comprises receiving the selection of the region on the object in combination with a selection of a reference point other than the selected region on the object.

* * * * *